Patented Oct. 13, 1931

1,827,591

UNITED STATES PATENT OFFICE

WINTHROP STANLEY LAWRENCE, OF BROOKLYN, NEW YORK, ASSIGNOR TO KAUMA-GRAPH COMPANY, OF NEW YORK, N. Y., A CORPORATION OF NEW YORK

DYEING TRANSFER AND TRANSFER INK

No Drawing. Application filed April 14, 1928. Serial No. 270,157.

My invention relates to a new and improved dyeing transfer and a transfer ink.

One of the objects of my invention is to provide a dyeing transfer by means of which designs or the like can be transferred to a fabric with little or no danger of soiling the fabric.

Another object of my invention is to provide a dyeing transfer which can be readily applied or used by ordinary methods and by unskilled labor.

Another object of my invention is to provide a dyeing transfer which can be utilized without applying water to the fabric.

Other objects of my invention will be set forth in the following description, it being understood that the above general statement of the objects of my invention is intended to generally explain the same and not to limit it in any manner.

Heretofore dyeing transfers which have been utilized for marking fabrics have been transferred, in order to fix the dye on the fabric, by the use of water or steam. Numerous difficulties have arisen in utilizing such dyeing transfers. If it is necessary to use water in the transfer process, the fabrics must be moistened. Applying this type of transfer by means of steam is too uncertain for the average unskilled person whose equipment ordinarily consists of an electric iron.

I have discovered that if resorcin, a crystalline organic substance which is a dihydroxy derivative of benzene, is caused to react with paraformaldehyde at a temperature of about 120° C., at which temperature the resorcin is fluid, and the reaction is carried on with a small amount of the paraformaldehyde, that a fusible resinous product is obtained which is a good solvent for certain lakes. While the exact time for the reaction depends upon the size of the batch and the dimensions of the receptacle in which the reaction is being carried on, I have found that ordinarily about one-half hour is the proper reaction time. If the reaction is allowed to proceed too far, the resultant product is hard and cannot be decomposed or disintegrated by steam to its constituent products. It is desired to have a product which is no longer crystalline like the original resorcin product, and at the same time to avoid having a product which cannot be decomposed or disintegrated readily by steam. The fact that only a small amount of paraformaldehyde is used in the solution controls the characteristics of the final product, because if too much paraformaldehyde is employed the resultant product is too hard and cannot be decomposed or disintegrated by steam. While I prefer to use paraformaldehyde because this can be utilized more conveniently than ordinary formaldehyde solution, it would not be departing from my invention to use ordinary formaldehyde solution. Likewise, the crystallization of the resorcin after the printing process is eliminated. This fusible resinous product acts as a fusible solvent for various soluble dyes, including mixtures of dyes and mordants suitable for transferring or printing upon cotton and silk.

The resinous product thus secured may be dissolved in water, fifteen grams of the resinous product being dissolved in twenty grams of water. For example, the resinous product may be allowed to cool to about 100° C. and it is then dissolved in the water. Then ten grams of gum arabic may be dissolved at said temperature of about 100° C. in the solution, or if desired, ten grams of the gum arabic may be first dissolved in water, before the resinous product is dissolved therein. One gram of methylene blue, two and one half grams of tannic acid and one gram of cornstarch may also be dissolved in the solution of the fusible resin, at the previously mentioned temperature of 100° C. The solution is then allowed to cool to ordinary room temperature, namely, about 60°–70° F. and one and one-half grams of zinc chloride are then slowly dissolved therein. It is undesirable to add the zinc chloride at a high temperature, because zinc chloride is so hygroscopic that it is a very active condensing agent, so that its addition at a high temperature would injure the properties of the final product.

The solution secured by the various ingredients above mentioned is highly viscous and has about the same viscosity as ordinary molasses. The viscosity of the solution can be regulated by adding more or less water thereto, so as to secure products for different types of printing.

In order to form the fusible resinous product, about fifteen grams of the resorcin are caused to react with from two to two and one-half grams of the paraformaldehyde.

In textile printing utilizing basic dyes, the practice has been to first treat the fibre with tannic acid, and then precipitate the tannic acid in the form of an insoluble metal salt thereof, by means of tartar emetic. The cloth could then be treated with the basic dyes because the tannic acid was readily absorbed by the fibres of the cloth to form a lake with the basic dye. The metal salt precipitated the lake in a more insoluble form. In printing on cotton, the tannic acid was the mordant and in printing on silk and wool, the basic dye had an affinity for the fibre itself and was fixed in a more insoluble form by the use of the antimony tannate.

According to my invention it is not necessary to utilize a series of independent operations because the fusible resinous product is a solvent for the dye and the aqueous solution before mentioned also contains zinc tannate in solution due to the reaction between the tannic acid and the zinc chloride. This zinc salt reacts with the dye to form a lake.

The viscous solution above mentioned can be directly used as a printing ink by means of intaglio rollers of the well known type, by means of which designs or the like may be suitably printed upon paper base strips. It is not necessary to heat the viscous solution for printing by means of intaglio rollers or the like. Upon drying, the dry viscous ink clings firmly to the paper base, and the outside surface thereof is non-tacky so that the paper base of the transfer can be conveniently rolled up or handled.

If the completed transfer is in a humid atmosphere, it may tend to absorb some moisture so that the ink becomes tacky, due to the presence of the zinc chloride. Under such conditions it is advantageous to dust the dry transfer with dextrose or cane sugar so as to produce a dry surface.

While I have disclosed one type of resinous product which is soluble in water, which does not cause the dried ink to be crystalline, and which can be decomposed by steam, my invention is not necessarily limited to this particular type of resinous product or to this particular type of compound. For example, condensation products produced by some of the polyhydric alcohols and the polybasic acids may be employed. For example, it is well known that certain condensation products can be made by the reaction of glycol or glycerine, and citric acid. Of course, in preparing these condensation products, the reaction is not carried out to the point where the resultant product is hard and infusible.

The ink prepared as above mentioned can be given any suitable color by proper choice of the coloring ingredient, and any number of colors may be utilized for making a multi-colored transfer. The ink used for making each impression should be allowed to dry before the next impression is made, to prevent any danger of off-setting.

After the transfer has dried, the ink can be transferred to the sheet of fabric or any other porous body by means of heat alone, that is by pressing the rear of the tranfer base with an ordinary hot iron. The ink melts sufficiently to be absorbed by the fabric, leather or other body.

The fabric, leather, or the like, may then be treated with steam to decompose the condensation product and to release the lake which has been dissolved therein. This steam can be generated by using an ordinary hot iron which is pressed upon a damp cloth applied to the imprinted face of the fabric or the like, or any other suitable steaming process may be used.

While I have mentioned the best benzene derivative condensation product, my invention is not limited thereto. For example, a condensation product can be made by the use of ordinary phenol although this is somewhat objectionable because of the odor thereof. Likewise, instead of using resorcin as the starting point of the reaction, I could employ hydroquinone, gallic acid, phloroglucinol.

Likewise, instead of employing gum arabic to impart viscosity and "body" to the ink, other gums having similar properties may be utilized such as dextrose or dextrine for example. Likewise, basic dyes other than methylene blue may be utilized, for imparting various colors to the ink. The purpose of adding a small amount of cornstarch to the mixture is to have therein a small quantity of an infusible substance which in the aqueous solution gives very high viscosity. However, the cornstarch does not interfere with the fusibility of the ink, when the ink is in the dry state. Instead of cornstarch, gum tragacanth or karaya gum could be used.

The tannic acid combines with the basic coloring matter to form a lake to which the citric acid may be added as this imparts a slight acidity so as to cause the lake to be more readily fixed upon the fibre of a piece of cloth for example. While other materials may be used for forming lakes with the basic dye, the tannic acid is the best known substance for this purpose. I believe that the lake which is formed by the reaction between the basic dye, the zinc chloride and the tannic acid forms a true solution in the fusible resinous product.

The purpose of adding the zinc chloride is to form the zinc salt of the lake, which is less fugitive than the lake itself.

Instead of utilizing the improved resinous solution of the lake in the form of a viscous solution, the said product might be utilized in the form of a dry powder which could be applied by the well known dusting process. For example, the fusible resinous mixture, undissolved in water, and free from water, may have the basic dye, the tannic acid and the cornstarch and some or all of the gum arabic previously mentioned, intimately intermingled therewith so as to form a solid mass, which can be cooled and which then can be readily ground into the form of powder.

While it is not necessary to have the tannic acid a constituent of this powder, this is preferable because it is a dry ingredient which reacts with the dye to form a species of lake.

The paper transfer base can then be printed by any ordinary relief process or any ordinary surface printing process (as distinguished from the intaglio printing previously mentioned) by means of a viscous ink of any suitable type. A suitable water soluble ink for this purpose would be gum arabic dissolved in ethylene glycol, or glycerol, or glycerol citrate. The necessary zinc chloride should also be dissolved in the ink, and enough dye to make the impression visible.

After the paper base of the transfer has been printed with this ink, the moist impression is dusted with the powder previously made, and the paper base is then warmed until the various ingredients react to produce the same result ordinarily secured by printing with the thick viscous ink solution previously mentioned. The usual procedure in making paper transfers by the dusting process is to be followed.

It will be noted that in either embodiment of my invention, the dry transfer base has a marking or impression, said marking comprising a fusible vehicle containing a lake, said vehicle being decomposable by steam.

I have shown a preferred embodiment of my invention, but it is clear that numerous changes and omissions could be made without departing from its spirit.

I claim:

1. A fusible marking composition comprising a fusible and resinous vehicle having coloring matter therein, said coloring matter being releasable from said vehicle under the action of steam when said composition is on the object to be marked, said vehicle being decomposable under the action of steam.

2. For use in a marking composition, a condensation product serving as a vehicle and having coloring matter incorporated therein, said condensation product being decomposable under the action of steam to release the matter when said composition is on the object to be marked.

3. A marking composition comprising a vehicle having coloring matter therein, said vehicle being a benzene derivative condensation product, said composition being decomposable by steam when it is on the object to be marked.

4. A marking composition comprising a vehicle having coloring matter therein, said vehicle being a phenol condensation product which is a benzene derivative and is decomposable by steam when said composition is on the object to be marked.

5. A marking composition comprising a lake dispersed in a fusible and resinous vehicle decomposable by the action of steam when said composition is on the object to be marked.

6. A marking composition comprising coloring matter embodied in a fusible and resinous vehicle decomposable by the action of steam when said composition is on the object to be marked, said fusible vehicle also containing a relatively small amount of non-fusible material uniformly incorporated therein.

7. A marking composition comprising a fusible and resinous vehicle decomposable under the action of steam when said composition is on the object to be marked and having a relatively small amount of non-fusible material incorporated therein, said vehicle having a lake dispersed therein.

8. A marking composition comprising a solution of a condensation product, said solution also containing a lake, said condensation product being adapted to take up said lake when the solvent is driven off, said condensation product being then decomposable by the action of steam to release said lake.

9. A marking composition comprising a solution of a condensation product, said solution also containing a lake formed by the action of a zinc salt, said condensation product being adapted to take up said lake when the solvent is driven off, said condensation product being then decomposable by the action of steam to release said lake.

In testimony whereof I affix my signature.

WINTHROP STANLEY LAWRENCE.